(12) United States Patent
Soddu et al.

(10) Patent No.: US 9,416,200 B2
(45) Date of Patent: Aug. 16, 2016

(54) PROCESS FOR THE PREPARATION OF 1,3-BUTADIENE AND STYRENE COPOLYMERS AND USE THEREOF IN VULCANIZABLE ELASTOMERIC COMPOSITIONS

(75) Inventors: Luca Soddu, Bologna (IT); Gabriele Veneri, Ravenna (IT)

(73) Assignee: VERSALIS S.P.A. (IT)

( * ) Notice: Subject to any disclaimer, the term of this patent is extended or adjusted under 35 U.S.C. 154(b) by 305 days.

(21) Appl. No.: 14/127,339

(22) PCT Filed: Jun. 21, 2012

(86) PCT No.: PCT/EP2012/061981
§ 371 (c)(1),
(2), (4) Date: Dec. 18, 2013

(87) PCT Pub. No.: WO2013/000817
PCT Pub. Date: Jan. 3, 2013

(65) Prior Publication Data
US 2014/0155543 A1    Jun. 5, 2014

(30) Foreign Application Priority Data

Jun. 29, 2011   (IT) .............................. MI2011A1198

(51) Int. Cl.
| | | |
|---|---|---|
| *C08C 19/42* | (2006.01) | |
| *C08C 19/44* | (2006.01) | |
| *C08F 236/10* | (2006.01) | |

(52) U.S. Cl.
CPC .................. *C08C 19/42* (2013.01); *C08C 19/44* (2013.01); *C08F 236/10* (2013.01)

(58) Field of Classification Search
CPC ........ C08C 19/42; C08C 19/44; C08F 236/10
USPC ................................ 525/333.1, 122; 524/572
See application file for complete search history.

(56) References Cited

U.S. PATENT DOCUMENTS

| | | | | |
|---|---|---|---|---|
| 5,134,199 A | * | 7/1992 | Hattori .................. | C08F 297/04 525/250 |
| 5,231,153 A | * | 7/1993 | Hsu ........................ | C08F 236/10 502/155 |
| 5,798,419 A | * | 8/1998 | Ruiz Santa Quiteria .................. | C08C 19/44 525/332.9 |
| 6,518,350 B1 | * | 2/2003 | Kobayashi ............ | B60C 1/0016 524/114 |

FOREIGN PATENT DOCUMENTS

EP         0754710 A2    1/1997

* cited by examiner

*Primary Examiner* — Ling Choi
*Assistant Examiner* — Chun-Cheng Wang
(74) *Attorney, Agent, or Firm* — Tarolli, Sundheim, Covell & Tummino LLP

(57) ABSTRACT

A process for the preparation of a 1,3-butadiene and styrene copolymer comprising the following steps: a) anionically polymerizing a blend comprising from 5% by weight to 40% by weight of styrene and from 60% by weight to 95% by weight of 1,3-butadiene, with respect to the overall weight of the mixture, in the presence of at least one hydrocarbon solvent, of at least one lithium-based catalyst having the general formula $LiR_1$ wherein $R_1$ represents a linear or branched $C_3$-$C_{10}$ alkyl group, and of least one polar modifier; b) optionally, reacting the copolymer obtained in step (a) with at least one chain-end monomer selected from 1,3-butadiene, styrene and α-methylstyrene; c) reacting from 10% by weight to 70% by weight, preferably from 20% by weight to 50% by weight, of the lithium-terminated polymeric chains present in the copolymer obtained in step (a) or in step (b), with at least one coupling agent selected from liquid polyepoxides having at least three reactive sites capable of reacting with the carbon-lithium chain-ends; d) optionally, reacting the copolymer obtained in step (c) with at least one chain-end monomer selected from 1,3-butadiene, styrene and a-methylstyrene; e) reacting the linear polymeric chains remaining in the copolymer obtained in step (c) or in step (d), with at least one tin compound having the general formula $XSn(R_2)_3$ wherein X represents a halogen atom such as, for example, chlorine and R2 represents a linear or branched $C_1$-$C_{10}$ alkyl group.

13 Claims, No Drawings

PROCESS FOR THE PREPARATION OF 1,3-BUTADIENE AND STYRENE COPOLYMERS AND USE THEREOF IN VULCANIZABLE ELASTOMERIC COMPOSITIONS

The present invention relates to a process for the preparation of a 1,3-butadiene and styrene copolymer and the use thereof in vulcanizable elastomeric compositions.

More specifically, the present invention relates to a process for the preparation of a 1,3-butadiene and styrene copolymer containing polymer-epoxide bonds and terminated with tin trialkyl.

A further object of the present invention also relates to a vulcanizable elastomeric composition comprising at least one copolymer obtained with the above process.

In the present description, all the information provided and relating to the operative and non-operative conditions should be considered preferred, even if not explicitly indicated.

1,3-butadiene and styrene copolymers suitable for producing tyres having a low rolling resistance, are known in literature. European patent EP 754710B1, for example, describes a process for the preparation of 1,3 butadiene and styrene copolymers having a maximum of 70% of polymer with a star structure and at least 30% with a linear structure, with all the linear chains terminating with a tin atom. The above-mentioned copolymers are said to be capable of producing tyres having an improved rolling resistance without negatively influencing the other properties of said tyres, such as wet skid resistance.

In accordance with the above patent, monomers of 1,3 butadiene and styrene are polymerized (anionic polymerization) in the presence of a hydrocarbon solvent, of an initiator based on lithium alkyl and of a polar modifier, for example tetrahydrofuran (THF), at a temperature ranging from 0° C. to 150° C. After an optional and partial termination of the polymeric chains with less than 2% of a terminal monomer selected from 1,3 butadiene, styrene or other conjugated diene, or another vinyl aromatic compound, not more than 70% of the copolymer obtained is subjected to a coupling reaction in the presence of a coupling agent such as, for example, tin or silicon trichloride or tetrachloride.

After a further, optional reaction of the copolymer obtained from said coupling reaction with up to 2% of a terminal monomer selected from 1,3 butadiene, styrene, or another conjugated diene, or another vinyl aromatic compound, the linear polymeric chains remaining in the copolymer are subjected to termination reaction with a tin compound, preferably trialkyl tin chloride.

Among the numerous examples of coupling agents which can be successfully used in anionic polymerization, polyepoxides are also known. Polyepoxides allow to obtain copolymers having structures with various branchings (depending on the epoxidation degree of the polyepoxides used) which contain polar functional groups, mainly hydroxyl groups (—OH) generated by the reaction between the polyepoxide and the living terminal, and non-reacted epoxy groups. Both of said functional groups are capable of giving specific interactions and therefore of increasing the interaction with the fillers such as, for example, carbon black and/or silica, characterized by the presence of surface polar groups, generally present in the vulcanizable elastomeric compositions.

The use of said coupling agents, however, is not always capable of giving the desired results. Sometimes, in fact, the copolymers obtained can show unsatisfactory performances due, for example, to their poor compatibility with the fillers, in particular with carbon black and/or silica, more specifically with carbon black.

The Applicant has therefore faced the problem of finding a process for the preparation of copolymers based on 1,3-butadiene and styrene which do not have the drawback of having a poor compatibility with said fillers.

The Applicant has now found that the preparation of 1,3 butadiene and styrene copolymers having a good compatibility with fillers, in particular with carbon black and/or silica, more specifically with carbon black, can be advantageously carried out by means of anionic polymerization of 1,3 butadiene and styrene, coupling by means of coupling agents selected from liquid polyepoxides, termination by means of tin compounds.

An object of the present invention therefore relates to a process for the preparation of a copolymer of 1,3 butadiene and styrene comprising the following steps:

a) anionically polymerizing a blend comprising from 5% by weight to 40% by weight of styrene and from 60% by weight to 95% by weight of 1,3-butadiene, with respect to the overall weight of the mixture, in the presence of at least one hydrocarbon solvent, of at least one lithium-based catalyst having the general formula $LiR_1$ wherein $R_1$ represents a linear or branched $C_3$-$C_{10}$ alkyl group, and of least one polar modifier;

b) optionally, reacting the copolymer obtained in step (a) with at least one chain-end monomer selected from 1,3-butadiene, styrene, α-methylstyrene;

c) reacting from 10% by weight to 70% by weight, preferably from 20% by weight to 50% by weight, of the lithium-terminated polymeric chains present in the copolymer obtained in step (a) or in step (b), with at least one coupling agent selected from liquid polyepoxides having at least three reactive sites capable of reacting with the carbon-lithium chain ends;

d) optionally, reacting the copolymer obtained in step (c) with at least one chain-end monomer selected from 1,3-butadiene, styrene, α-methylstyrene;

e) reacting the linear polymeric chains remaining in the copolymer obtained in step (c) or in step (d), with at least one tin compound having the general formula $XSn(R_2)_3$ wherein X represents a halogen atom such as, for example, chlorine and $R_2$ represents a linear or branched $C_1$-$C_{10}$ alkyl group.

For the purpose of the present description and of the following claims, the definitions of the numerical ranges always include the extremes unless otherwise specified.

According to the present invention, said anionic polymerization is carried out in the presence of at least one hydrocarbon solvent which can be selected, for example, from aliphatic or cycloaliphatic hydrocarbons such as, for example, n-pentane, n-hexane, n-heptane, cyclohexane, or mixtures thereof.

The quantity of solvent used in said anionic polymerization is generally such as to allow the complete solubility of the monomers (i.e. styrene and 1,3-butadiene), of the additives optionally present and of the copolymer obtained at the end of the same, the complete stirring of the reaction mixture, also during said polymerization, and the diffusion of the reaction heat. Preferably, said anionic polymerization can be carried out at temperatures ranging from 0° C. to 150° C., more preferably from 20° C. to 120° C., carrying out the polymerization reaction under adiabatic and/or isothermal conditions.

In order to regulate the formation of a copolymer with a very random distribution of the styrene and butadiene units, said anionic polymerization is carried out in the presence of at least one polar modifier. Preferably, said polar modifier can be selected, for example, from: ethers such as, for example, tetrahydrofuran (THF), tetrahydrofurfurylethyl ether (THFAethyl), or mixtures thereof; diamines such as, for example, N,N,N',N'-tetramethylethylenediamine (TMEDA); of mixtures thereof.

A preferred polar modifier, for its randomizing capacity, is tetrohydrofuran (THF). Said polar modifier can be used in a quantity ranging from 0.15% be weight to 5% by weight, with respect to the total weight of the reaction mixture. It should be noted, however, that if N,N,N',N'-tetramethylethylenediamine (TMEDA) or tetrahydrofurfurylethyl ether (THFAethyl) is used as polar modifier, the quantity used in the reaction mixture is much lower and preferably ranges from 50 ppm to 1,000 ppm.

Said anionic polymerization can be carried out in continuous or batchwise. In both cases, the solvent, the monomers (i.e. styrene and 1,3 butadiene) and the polar modifier, are charged into a stirred reactor to which the lithium-based catalyst is added, such as, for example, n-butyl lithium, sec-butyl lithium. After bringing the reaction mixture to the operating temperature, the polymerization reaction is carried out for a period of time ranging from 10 minutes to 5 hours, in relation to the concentration of the reagents, the catalyst and the temperature profile used.

As the polymerization of 1,3-butadiene and styrene, in the presence of an adequate quantity of said polar modifier, takes place randomly, the type of monomer at the end of the chain can be controlled by reaction of the copolymer obtained in step (a) with at least one reactive monomer [capping—step (b)]. Said monomer is reactive with the living polymeric species P—Li$^+$, wherein P represents the linear chain of the copolymer of 1,3-butadiene and styrene obtained in step (a). Said reactive monomer can preferably be selected from 1,3-butadiene, styrene, α-methylstyrene. Preferably, said reactive monomer can be used in a quantity ranging from 0% by weight to 10% by weight, more preferably from 0.1% by weight to 6% by weight, with respect to the weight of said copolymer.

The copolymer obtained in step (a) or in step (b) is subjected to a coupling reaction [step (c)], in the presence of at least one coupling agent selected from liquid polyepoxides having at least three reactive sites capable of reacting with the carbon-lithium chain-ends, preferably from 3 to 6 reactive sites. Preferably, said liquid polyepoxides can be selected from epoxidized soybean oil, epoxidized linseed oil, or mixtures thereof. Epoxidized soybean oil and epoxidized linseed oil are products available on the market under the trade-name of EPDXOL® D65 (produced by FACI—Italy) and PLASTHALL® ELO (produced by Hallstar—USA), respectively.

Alternatively, said epoxidized oils can be prepared by processes known in the art, such as, for example, by epoxidation of the double bonds present in the structure of the vegetable oil by reaction with a peracid prepared in situ by reacting an organic acid (e.g., acetic acid) and oxygenated water.

After carrying out a further optional termination reaction [step (d)] of the linear chains present in the copolymer obtained in step (c) by reaction with at least one reactive monomer selected from 1,3-butadiene, styrene, α-methylstyrene, the linear polymeric chains which have not coupled with the above-mentioned coupling agent, are reacted with at least one compound of tin [step (e)]. Preferably, said tin compound can be selected, for example, from tin trimethyl chloride, tin tributyl chloride, tin tripentyl chloride, tin trioctyl chloride, or mixtures thereof. Tin trioctyl chloride is particularly preferred.

At the end of the anionic polymerization process object of the present invention, a solution of a copolymer of 1,3-butadiene and styrene is substantially obtained, comprising a first copolymer with a radial or star structure, constructed on the polyepoxide and characterized by the polymer-epoxide bond, and a second copolymer with a linear structure terminated with polymer-tin bonds [i.e. polymer-Sn(R$_2$)$_3$]. The final copolymer can be recovered from the reaction mixture by techniques known in the art such as, for example, solvent evaporation, non-solvent precipitation, and subsequent filtration.

As mentioned above, the copolymer of 1,3-butadiene and styrene obtained by means of the process, object of the present invention, can be advantageously used in vulcanizable elastomeric compositions, optionally in the presence of other (co)polymers, to produce vulcanized end-products having improved physico-mechanical properties.

Said copolymer of 1,3-butadiene and styrene can be used, for example, in a mixture with carbon black and/or silica, as component of vulcanizable elastomeric compositions suitable for the preparation of tyres having a low rolling resistance and a good wet skid resistance.

It should be noted that, thanks to the presence of the polymer-tin bonds, the copolymer/carbon black interaction is particularly improved.

A further object of the present invention therefore relates to a vulcanizable elastomeric composition comprising at least one 1,3-butadiene and styrene copolymer obtained as described above, at least one filler selected from carbon black, silica, or mixtures thereof ad at least one vulcanizing agent. Preferably, said filler may be present in said vulcanizable elastomeric composition in a quantity ranging from 5 phr to 500 phr.

For the purpose of the present invention and of the following claims, the term "phr" indicates the parts by weight of a certain component per 100 parts by weight of (co)polymer(s) present in the vulcanizable elastomeric composition.

Said vulcanizing agent can be selected, for example, from soluble or insoluble elemental sulfur, or from sulfur donors, or mixtures thereof.

Sulfur donors are, for example, dimorpholyl disulfide (DTDM), 2-morpholine-dithiobenzothiazole (MBSS), caprolactam disulfide, dipentamethylenethiuram tetrasulfide (DPTT), tetramethylthiuram disulfide (TMTD), or mixtures thereof.

If the vulcanizing agent is selected from sulfur or sulfur donors, in order to increase the vulcanization yield, it can also be advantageous to use other additives such as, for example, dithiocarbamates, thiurams, thiazoles, sulfenamides, xanthogenates, derivatives of guanidine, caprolactams, derivatives of thiourea, or mixtures thereof.

In said vulcanizable elastomeric composition, said sulfur and/or said sulfur donors, and said other additives indicated above optionally present, are generally present in a quantity ranging from 0.05 phr to 10 phr, preferably ranging from 0.1 phr to 8 phr.

Other compounds can be added to the vulcanizable elastomeric compositions object of the present invention.

Inorganic or organic compounds can be added, for example. Examples of said compounds are: zinc oxide; zinc carbonate; lead oxide; saturated or unsaturated organic fatty acids or their zinc salts; polyalcohols; amine alcohols (e.g., triethanolamine); amines (e.g., dibutylamine, dicyclohexylamine, cyclohexylethylamine); polyether amines; or mixtures thereof.

Vulcanization inhibitors such as, for example, N-cyclohexylthiophthalimide (PVI), N,N'-dinitrosopentamethylenetetramine (DNPT), phthalic anhydride (PTA), diphenylnitrosamine, or mixtures thereof, may also be added.

In addition to the above vulcanizing agents and/or to the other compounds indicated above, the vulcanizable elastomeric composition object of the present invention, can comprise other additional additives normally used in rubber and known to experts in the field such as, for example, other fillers, filler activators, ozone protection agents, aging inhibitors, antioxidants, processing aids, extender oils, plasticizers, reinforcing materials, mould releasing agents.

Other fillers that can be used for the purpose of the present invention are, for example: barium sulfate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon® (preferably in powder form), silicates, or mixtures thereof. The total quantity of fillers generally ranges from 5 phr to 500 phr.

Filler activators that can be used for the purpose of the present invention are, for example: organic silanes such as, for example, vinyltrimethyloxysilane, vinyldimethoxymethylsilane, vinyltriethoxysilane, vinyltris-(2-methoxyethoxy) silane, N-cyclohexyl-3-aminopropyltrimethoxysilane, 3-amino-propyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane, (octadecyl)methyldimethoxysilane, or mixtures thereof. Further filler activators are, for example, surfactant substances such as triethanolamine, ethylene glycols, or mixtures thereof. The quantity of filler activators generally ranges from 0 phr to 10 phr.

A further object of the present invention also relates to a vulcanized end-product obtained from the vulcanization of said vulcanizable elastomeric compositions.

The preferred vulcanized end-product according to the present invention is a tyre for road vehicles, more preferably a tyre tread for road vehicles.

The present invention is now described with reference to the following examples which represent an illustrative but non-limiting embodiment.

EXAMPLE 1 (COMPARATIVE)

8,000 g of an anhydrous mixture of cyclohexane/hexane in a weight ratio of 9/1, equal to a filling factor of 80%, 3.12 g of a polar modifier (tetrahydrofurfurylethyl ether—THFA-ethyl), corresponding to 255 ppm, in a molar ratio of approximately 3:1 with the theoretical quantity of initiator and subsequently 300 g of styrene and 840 g of 1,3-butadiene, are charged into a stirred 16 liter reactor. The reaction mixture obtained is heated to a temperature of 40° C. by means of a heating jacket. 0.51 g of lithium n-butyl in n-hexane (3.41 g of a solution at 15% by weight) are then fed. The heating of the jacket is then excluded and the increase in temperature of the reaction mixture takes place as a result of the exothermic nature of the reaction, up to a final temperature (peak temperature) of about 76° C. After waiting 10 minutes after the peak temperature has been reached, 60 g of 1,3-butadiene are fed (capping) so that all the living terminals are of the butadienyl type. After waiting a further 10 minutes to eliminate the free monomers, 0.170 g of silicon tetrachloride are added, corresponding to a theoretical 50% coupling efficiency. After waiting a further 5 minutes for the completion of the coupling reaction, 0.434 g of trimethylchloride silane are fed to deactivate the residual living terminals. The solution obtained is then discharged after 10 minutes into a tank where it is stabilized with 0.7 phr of 2,6-di-t-butylphenol (BHT) and the whole solution reaches the desolventizing section by stripping with water.

EXAMPLE 2 (COMPARATIVE)

The same feeding procedure of the reagents described in Example 1 is followed in a stirred 16 liter reactor until the introduction of the coupling agent which in this case is tin tetrachloride in a quantity equal to 0.261 g, corresponding to a theoretical 50% coupling efficiency. The remaining phases of the reaction are the same as those described in Example 1.

EXAMPLE 3 (COMPARATIVE)

The same feeding procedure of the reagents described in Example 1 is followed in a stirred 16 liter reactor until the completion of the coupling reaction with 0.261 g of tin tetrachloride. After 5 minutes, 1.30 g of trioctyl tin chloride are fed to deactivate the residual living terminals. The polymeric solution is then discharged after 10 minutes into a tank where it is stabilized with 0.7 phr of 2,6-di-t-butylphenol (BHT) and the whole solution reaches the desolventizing section by stripping with water.

EXAMPLE 4 (INVENTION)

8,000 g of an anhydrous mixture of cyclohexane/hexane in a weight ratio of 9/1, equal to a filling factor of 80%, 3.12 g of a polar modifier (tetrahydrofurfurylethyl ether—THFA-ethyl), corresponding to 255 ppm, in a molar ratio of approximately 3:1 with the theoretical quantity of initiator and subsequently 300 g of styrene and 840 g of 1,3-butadiene, are charged into a stirred 16 liter reactor. The reaction mixture obtained is heated to a temperature of 40° C. by means of a heating jacket. 0.51 g of lithium n-butyl in n-hexane (3.41 g of a solution at 15% by weight) are then fed. The heating of the jacket is then excluded and the increase in temperature of the reaction mass takes place as a result of the exothermic nature of the reaction, up to a final temperature (peak temperature) of about 76° C. After waiting 10 minutes after the peak temperature has been reached, 60 g of 1,3-butadiene are fed (capping) so that all the living terminals are of the butadienyl type. After waiting a further 10 minutes to eliminate the free monomers, 0.3 g of epoxidized soybean oil are added, corresponding approximately to a theoretical 50% coupling efficiency. After 5 minutes, 1.30 g of trioctyl tin chloride are fed to deactivate the residual living terminals. The solution obtained is then discharged after 10 minutes into a tank where it is stabilized with 0.7 phr of 2,6-di-t-butylphenol (BHT) and the whole solution reaches the desolventizing section by stripping with water.

The 1,3-butadiene and styrene copolymers obtained were characterized using the techniques indicated hereunder.

Determination of the microstructure—content of 1,2 vinyl units and of the bound styrene via FTIR (Fourier Transform Infra Red) spectroscopy by means of absorption bands (and on the calculation of their relative intensity) characteristic of the three types of butadiene chaining—1,4 cis (800 cm$^{-1}$ and 640 cm$^{-1}$), 1,4 trans (1018 cm$^{-1}$ and 937 cm$^{-1}$) and 1,2 (934 cm$^{-1}$ and 887 cm$^{-1}$) and of the bound styrene (between 715 cm$^{-1}$ and 680 cm$^{-1}$).

Determination of the molecular weight distribution (MWD) carried out by means of Gel Permeation Chromatography (GPC) carried out by flowing a solution in tetrahydrofuran (THF) of the polymer over a series of columns containing a solid phase consisting of a crosslinked polystyrene having a different porosity size.

Determination of the Mooney Viscosity carried out at 100° C. using a Viscometer Monsanto MV2000E, method ASTM D1646 with a rotor of the L type and with times 1+4.

Determination of the glass transition temperature Tg by means of Differential Scanner Calorimetry (DSC).

The blends were prepared in a 1.6 liter Banbury-type internal mixer according to the formulations described in Table 1 and in Table 2.

The mixing cycle for the formulation reported in Table 1 has the following characteristics:

| | |
|---|---|
| Initial Temperature | 60° C. |
| Cycle | 6 minutes |
| Final Temperature | 150° C. |

The acceleration of the blend is carried out in a Banbury-type internal mixer for 2 minutes and subsequently for 3 minutes in a calender.

The samples were then vulcanized at 160° C. following the standard ISO 6502.

TABLE 1

Formulation of the blend

| INGREDIENTS | phr |
|---|---|
| SSBR | 55 |
| NR | 35 |
| BR | 10 |
| N220 | 45 |
| Silica | 15 |
| Naphthene oil | 15 |
| 6-PPD | 2 |
| Paraffinic wax | 2 |
| ZnO | 2 |
| Stearic acid | 1 |
| Polyplastol ® 6 | 3 |
| Silane | 2 |
| DPG | 0.5 |
| TBBS | 1.4 |
| Sulfur | 2.1 |
| PVI | 0.2 |

SSBR: copolymers of styrene and 1,3-butadiene obtained as described above in Examples 1-4;
NR: natural rubber;
BR: cis-1,4-polybutadiene (Europrene ® Neocis BR40-Po-limeri Europa);
N220: carbon black;
Silica: Ultrasil ® VN3 (Egesyl Kimia);
Naphthene oil: ASTM type 103HV (Japan Sun Oil);
6-PPD: Santoflex ® 13 (Monsanto);
Paraffinic wax: Riowax ® 721 (Andrea Gallo Di Luigi s.r.l.);
Polyplastol ® 6: mixture of zinc salts of fatty acids (palmitic acid, stearic acid and oleic acid being present in higher quantities) (Great Lakes Chemical Corp.);
Silane: Si 69 ® (Evonik);
DPG (accelerator): diphenyl guanidine (Rhenogran ® DPG80-Rhein Chemie);
TBBS (accelerator): N-t-butyl-benzothiazole-2-sulfenamide (Vulkacit ® NZ/ECG-Lanxess);
PVI (retardant): N-cyclohexyl-thiophthalimide (Santogard ® PVI-Flexsys)

The mixing cycle for the formulation indicated in Table 1 has the following characteristics:

| | |
|---|---|
| Initial Temperature | 60° C. |
| Cycle | 12 minutes |
| Final Temperature | 115° C. |

The acceleration of the blend is carried out in a Banbury-type internal mixer for 2 minutes and subsequently for 3 minutes in a calender.

The samples were then vulcanized at 160° C. following the standard ISO 6502.

TABLE 2

Formulation of the blend

| INGREDIENTS | phr |
|---|---|
| SSBR | 75 |
| BR | 25 |
| N220 | 45 |
| Silica | 15 |
| Naphthene oil | 15 |
| 6-PPD | 2 |
| Paraffinic wax | 2 |
| ZnO | 2 |
| Stearic acid | 1 |
| Polyplastol ® 6 | 3 |
| Silane | 2 |
| DPG | 0.2 |
| TBBS | 0.5 |
| Sulfur | 1.4 |
| PVI | 0.2 |

SSBR: copolymers of styrene and 1,3-butadiene obtained as described above in Examples 1-4;
BR: cis-1,4-polybutadiene (Europrene ® Neocis BR40-Po-limeri Europa);
N220: carbon black;
Silica: Ultrasil ® VN3 (Egesyl Kimia);
Naphthene oil: Nitex ® 840 (Nynas);
6-PPD: Santoflex ® 13 (Monsanto);
Paraffinic wax: Riowax ® 721 (Andrea Gallo Di Luigi s.r.l.);
Polyplastol ® 6: mixture of zinc salts of fatty acids (palmitic acid, stearic acid and oleic acid being present in higher quantities) (Great Lakes Chemical Corp.);
Silane: Si 69 ® (Evonik);
DPG (accelerator): diphenyl guanidine (Rhenogran ® DPG80-Rhein Chemie);
TBBS (accelerator): N-t-butyl-benzothiazole-2-sulfenamide (Vulkacit ® NZ/ECG-Lanxess);
PVI (retardant): N-cyclohexyl-thiophthalimide (Santogard ® PVI-Flexsys).

The dynamic-mechanical characteristics of the vulcanized blends were determined using a Rheometrics® RDA2 rheometer carrying out the tests indicated hereunder. "Dynamic Strain Sweep" (tan δ @ 60° C.—rolling resistance) in configuration:

Frequency: 10 Hz
Temperature: 0° C. and 60° C.
Strain Range: 0.1%÷10%
Geometry: Rectangular torsion.
"Dynamic Temperature Sweep" (tan δ @ 0° C.—wet grip) in configuration:
Temperature range: −130° C.÷100° C. @ 2° C./min
Frequency: 1 Hz
Strain: 0.1%
Geometry: Rectangular torsion
Cooling: 3° C./min.

The tensile characteristics of the vulcanized blends were determined by applying the standard ISO 37 and using an Instron dynamometer.

The Shore hardness A was determined using the standard ISO 7619.

TABLE 3

Results of the characterization of the blends indicated in Table 1

| | SSBR (Example 1) | SSBR (Example 2) | SSBR (Example 3) | SSBR (Example 4) |
|---|---|---|---|---|
| $ML_{1+4}$@100° C. | 50 | 48 | 47 | 44 |
| % styrene | 20.8 | 21.3 | 20.5 | 22.3 |
| % vinyl | 65.0 | 63.1 | 64.9 | 65.4 |
| Tg [° C.] | −25 | −23 | −25 | −22 |
| MW $P_1$ [kdalton] | 150 | 152 | 148 | 144 |
| % $P_n$ | 46 | 44 | 45 | 43 |
| t90 [min] | 23 | 25 | 25 | 22 |
| Module 300% [MPa] | 4.50 | 4.72 | 5.16 | 5.40 |
| Stress at break | 16.8 | 17.3 | 17.8 | 19.6 |

TABLE 3-continued

Results of the characterization of the blends indicated in Table 1

| | SSBR (Example 1) | SSBR (Example 2) | SSBR (Example 3) | SSBR (Example 4) |
|---|---|---|---|---|
| [MPa] | | | | |
| Elongation at break. [%] | 650 | 770 | 750 | 730 |
| Shore A Hardness | 52.1 | 51.8 | 52 | 52.8 |
| tan δ@ 0° C. | 0.131 | 0.135 | 0.141 | 0.142 |
| tan δ@ 60° C. | 0.265 | 0.251 | 0.245 | 0.238 |

TABLE 4

Results of the characterization of the blends indicated in Table 2

| | SSBR (Example 1) | SSBR (Example 2) | SSBR (Example 3) | SSBR (Example 4) |
|---|---|---|---|---|
| $ML_{1+4}$@100° C. | 50 | 48 | 47 | 44 |
| % styrene | 20.8 | 21.3 | 20.5 | 22.3 |
| % vinyl | 65.0 | 63.1 | 64.9 | 65.4 |
| Tg [° C.] | −25 | −23 | −25 | −22 |
| MW $P_1$ [kdalton] | 150 | 152 | 148 | 144 |
| % $P_n$ | 46 | 44 | 45 | 43 |
| t90 [min] | 35.7 | 36.8 | 36.9 | 34.1 |
| Module 300% [MPa] | 3.8 | 3.95 | 4.74 | 4.39 |
| Stress at break [MPa] | 13.4 | 13.2 | 14.2 | 17.1 |
| Elongation at break [%] | 810 | 857 | 808 | 862 |
| Shore A Hardness | 54.5 | 54.5 | 55.5 | 54 |
| tan δ@ 0° C. | 0.142 | 0.140 | 0.144 | 0.151 |
| tan δ@ 60° C. | 0.245 | 0.241 | 0.237 | 0.229 |

From the data reported in Table 3 and in Table 4, it can be deduced that the copolymer of 1,3-butadiene and styrene obtained according to the present invention (Example 4) is capable of giving better results with respect to the physic and dynamic-mechanical characteristics of the vulcanized end-product, in particular with respect to the rolling resistance (value tan δ @ 60° C. lower) and the wet skid resistance (value tan δ @ 0° C. higher).

The invention claimed is:

1. A process for the preparation of a 1,3-butadiene and styrene copolymer comprising the following steps:
    (a) anionically polymerizing a blend comprising from 5% by weight to 40% by weight of styrene and from 60% by weight to 95% by weight of 1,3-butadiene, with respect to the overall weight of the blend, in the presence of at least one hydrocarbon solvent, of at least one lithium-based catalyst having the general formula $LiR_1$ wherein $R_1$ represents a linear or branched $C_3$-$C_{10}$ alkyl group, and of least one polar modifier;
    (b) optionally, reacting the copolymer obtained in step (a) with at least one chain-end monomer selected from 1,3-butadiene, styrene and α-methylstyrene;
    (c) reacting from 10% by weight to 70% by weight of the lithium-terminated polymeric chains present in the copolymer obtained in step (a) or in step (b), with at least one coupling agent selected from epoxidated vegetable oils having at least three reactive sites capable of reacting with the carbon-lithium chain ends;
    (d) optionally, reacting the copolymer obtained in step (c) with at least one chain-end monomer selected from 1,3-butadiene, styrene and α-methylstyrene;
    (e) reacting the linear polymeric chains remaining in the copolymer obtained in step (c) or in step (d), with at least one tin compound having the general formula $XSn(R_2)_3$ wherein X represents a halogen atom and $R_2$ represents a linear or branched $C_1$-$C_{10}$ alkyl group.

2. The process according to claim 1, wherein said anionic polymerization is carried out at a temperature ranging from 0° C. to 150° C.

3. The process according to claim 1, wherein said polar modifier is tetrahydrofurfurylethyl ether (THFAethyl).

4. The process according to claim 3, wherein said polar modifier is used in step (a) in a quantity ranging from 50 ppm to 1,000 ppm.

5. The process according to claim 1, wherein in step (b) said reactive monomer is used in a quantity ranging from 0% by weight to 10% by weight.

6. The process according to claim 1, wherein said epoxidated vegetable oils are selected from epoxidated soybean oil, epoxidated linseed oil, or mixtures thereof.

7. The process according to claim 1, wherein said tin compound is selected from tin trimethyl chloride, tin tributyl chloride, tin tripentyl chloride, tin trioctyl chloride, or mixtures thereof.

8. The process according to claim 7, wherein said tin compound is tin trioctyl chloride.

9. A vulcanizable elastomeric composition comprising at least one copolymer of 1,3-butadiene and styrene obtained according to claim 1, at least one filler selected from carbon black, silica, or mixtures thereof, and at least one vulcanizing agent.

10. The vulcanizable elastomeric composition according to claim 9, wherein said filler is present in a quantity ranging from 5 phr to 500 phr.

11. A vulcanized manufactured product obtained from the vulcanization of the vulcanizable elastomeric composition according to claim 9.

12. The vulcanized manufactured product according to claim 11, which is a tire for road vehicles.

13. The vulcanized manufactured product according to claim 12, which is a tire tread for road vehicles.

* * * * *